UNITED STATES PATENT OFFICE.

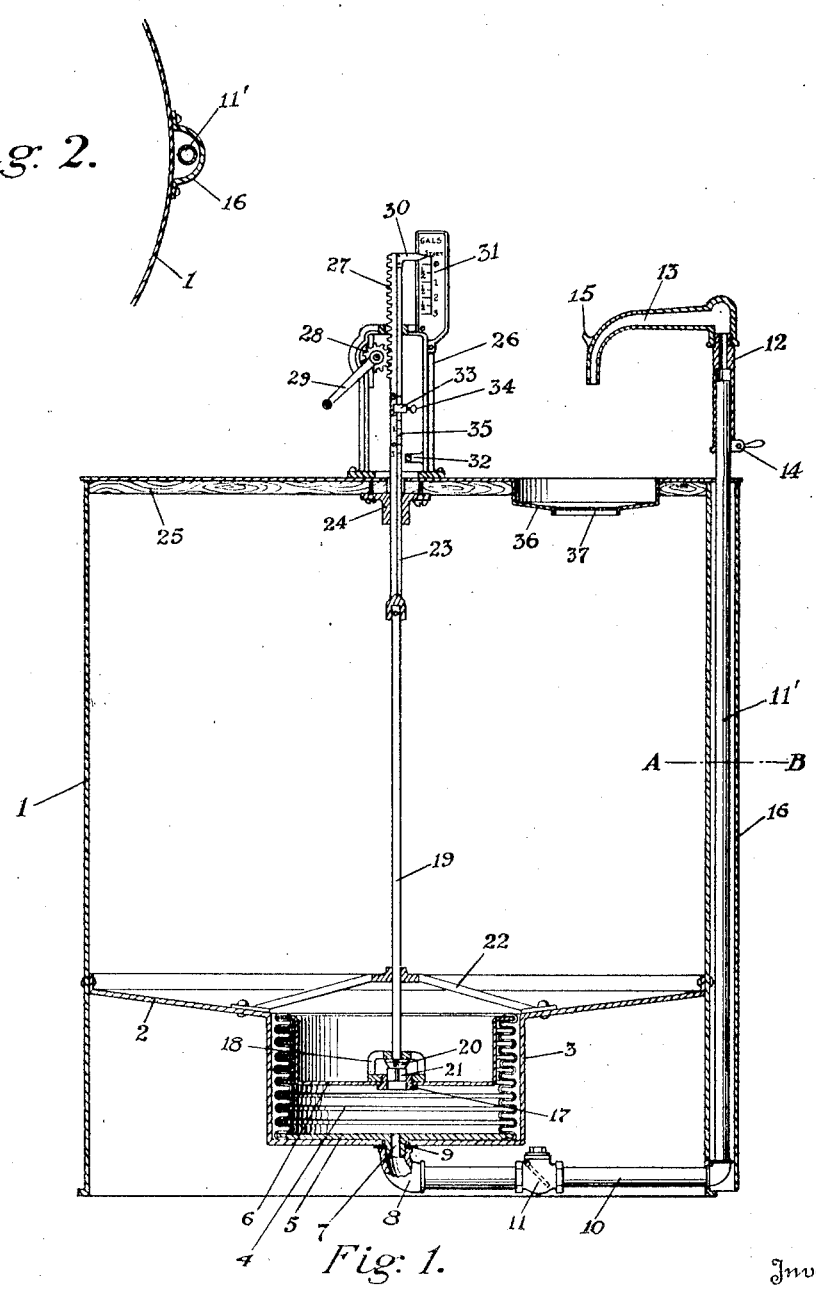

WESTON M. FULTON, OF KNOXVILLE, TENNESSEE, ASSIGNOR TO THE FULTON COMPANY, OF KNOXVILLE, TENNESSEE, A CORPORATION OF MAINE.

DISPENSING DEVICE.

1,332,392.  Specification of Letters Patent.  Patented Mar. 2, 1920.

Application filed September 2, 1916. Serial No. 118,245.

*To all whom it may concern:*

Be it known that I, WESTON M. FULTON, a citizen of the United States of America, and a resident of Knoxville, Tennessee, have invented a new and useful Improvement in Dispensing Devices, which invention is fully set forth in the following specification.

This invention relates to a dispensing device, and it has for an object to provide a device of this type which is simple in construction, inexpensive to manufacture, and accurate and efficient in operation.

It has been customary to employ in devices of this type a piston and cylinder for discharging the material contained therein. Such structures have been expensive to manufacture, as the cylinder must be turned true and smooth and the piston have a substantially perfect fit therein, to avoid leakage on the one hand and undue friction on the other. Furthermore, the wear between the piston and cylinder also results in leakage. Additionally, such structures have been limited to the dispensing of fluids that did not attack the material of the cylinder and piston or produce corrosion thereof.

It is an object of this invention to provide a dispensing device which does not employ a cylinder and piston, which avoids the frictional resistance of rubbing surfaces, and which reduces wear so that the device will not leak but continue to operate accurately throughout its life.

A further object of this invention is to provide a dispensing device of the type characterized with means for indicating the quantity of material delivered, and with further means whereby a predetermined quantity of material may be delivered without the necessity of observing an indicating device, enabling its use where light is poor.

Stated briefly, the invention comprises a container, an expansible and collapsible vessel, means of communication between the container and a space variable in volume by the expansion and contraction of said vessel, shown as the interior of said vessel, said means being preferably in the form of a port in the movable end wall of said vessel, a valve for controlling the aforesaid means of communication, and means both to actuate said valve and the movable end wall of said vessel to force the material in operative relation to said end wall through discharge means leading from the space variable in volume by the expansion and contraction of said vessel.

The invention is capable of receiving a variety of mechanical expressions, one of which, for the purpose of illustration, has been shown on the accompanying drawing. But it is to be expressly understood that this embodiment is for purposes of illustration only, and is not to be construed as a definition of the limits of the invention, reference being had to the appended claims for that purpose.

Referring in detail to the drawing, wherein the same reference characters indicate corresponding parts in the several figures, Figure 1 is a vertical section of a dispensing device embodying the present invention;

Fig. 2 is a horizontal section on the line A—B of Fig. 1.

Referring in detail to the drawing, 1 designates a container which may be of any desired configuration and constructed of any suitable material. Within the container 1, in the form shown, and adjacent the bottom thereof is a partition 2 rigidly secured to the walls of the container 1 and forming a fluid-tight joint therewith. Partition 2 slopes toward the central portion thereof, at which point is provided a well or receptacle 3, preferably cylindrical in shape. Within the well 3 is an expansible and collapsible vessel 4, preferably made of corrugated resilient metal, such vessel being of such dimensions as to nearly fill the receptacle 3 but not to contact with the walls of the receptacle when said vessel is collapsed to its utmost extent. Vessel 4 is provided with a fixed end wall 5, which may be brazed into the end corrugation of the vessel, and with a movable, rigid end wall 6, which may be similarly connected to the corrugation at the opposite end of such vessel. In the form shown on the drawing, the central portion of the movable end wall or head 6 of the expansible and collapsible vessel is depressed so as to contact the fixed end wall 5 when the vessel is fully collapsed. This, however, is not essential, and illustrates but one way of predetermining the discharge from the vessel, as will be explained more fully hereafter. The fixed end wall 5 of said vessel may be attached to the end wall of the container or receptacle in any suitable way, being shown as provided with a nipple 7 which extends through the bottom wall of the receptacle 3 and which receives, preferably by screw-threaded engagement, an elbow 8 of a discharging conduit in communication with the interior of the receptacle 3 or the vessel 4 therein. Preferably a washer 9 is interposed between the bottom of the receptacle 3 and the elbow 8 that the joint may be fluid-tight. From the elbow 8 extends a pipe 10 provided with a check-valve as illustrated at 11. From the pipe 10 extends a riser pipe 11' provided at its upper end with an adjustable extension 12 carrying a lateral extension or spout 13.

Said extension 12 may be mounted to rotate upon the riser pipe 11' and to be raised and lowered thereon, and retained in adjusted position by any suitable clamping device, as illustrated at 14. Spout 13 may be provided with a hooked projection 15 for receiving the bails of small receptacles. Riser pipe 11' may also be incased in a semi-circular housing 16, as clearly illustrated in Fig. 2, to protect the same from injury.

Means of communication are provided between the container and a space which is variable in volume by the expansion and contraction of the vessel 4. In the form shown, head 6 of said vessel is provided with a port constituting means of communication between the interior of the container and the interior of the vessel, such port being desirably formed by a valve sleeve 17 received in an aperture in the head 6 and retained in position by a cage-nut 18. Mounted for movement through an axial opening in the cage-nut 18 is a vertical reciprocating rod 19 carrying at its lower end a seating valve member 20 provided with a winged extension 21 fitting loosely within the bore of the sleeve 17 and guiding the movement of said valve member. Rod 19 may be further guided in its reciprocating movement by a spider 22 mounted in any suitable way, as by securing the same to the partition 2. The upper end of the reciprocating rod 19 is provided with operating means of any suitable construction, being shown as carrying a rack-bar 23 guided in its movement by a sleeve 24 secured to the under side of the cover 25 of the container and by a frame 26 mounted upon the upper face of the cover. The upper portion of rack-bar 23 is provided with teeth 27 on one edge, with which teeth mesh the teeth of a pinion 28 mounted in bearings in the frame 26. Pinion 28 is rotated by a crank 29 extending to a position where it may be readily operated by the hand.

Means are provided for indicating the extent of movement of the rack-bar 23 and reciprocating rod 19, such means being shown as taking the form of a scale and pointer, one of which is carried by the rack-bar. In the embodiment of the invention illustrated on the drawing, rack-bar 23 carries a pointer 30 coöperating with any desired scale 31 carried by an extension of the frame 26. Means are also preferably provided whereby the extent of movement of the rack-bar and reciprocating rod 19 may be predetermined. To this end a stop lug 32 is shown as provided on the frame 26 and an adjustable stop-piece 33 is carried by the rack-bar, being retained in adjusted position by any suitable means as a set-screw 34. The rack-bar may be provided with a scale, as indicated at 35, for the convenient adjustment of the stop-piece 34.

The cover 25 of the container is desirably provided with a depressed portion 36 in axial alinement with the delivery end of the spout 13 whereby a receptacle may be set therein when fluid is to be delivered thereto. The depressed portion 36 may also be provided with a strainer 37 whereby drippings from the spout 13 or the overflow from receptacles may drain back into the interior of the container 1.

The capacities of the expansible and collapsible vessel 4, when said vessel is in its fully expanded condition and when it is in its fully collapsed condition, can be readily ascertained, and the difference between such capacities represents the amount of material contained within the container 1 which will be discharged by the head 6 when moved from one extremity of its range of movement to the other. Vessel 4 with its movable head then constitutes a means for dispensing a predetermined and definite quantity of such material. Furthermore, it offers no frictional resistance from one part rubbing over another, it is free of the wear arising from such rubbing members, and it retains throughout the life of the vessel an absolute accuracy in its delivery of material. There is also a minimum likelihood of leakage and, owing to the nature of the parts, the structure is inexpensive to manufacture.

In operation, the discharge pipe 10, riser pipe 11' and adjustable extension 12 are primed by collapsing the vessel 4 and thereby forcing the material within the container and vessel through such conduit and pipes until it begins to flow from the spout 13. Check-valve 11 prevents the return of the material to the interior of the receptacle and container, and thereafter, upon each actuation of the head 6, there will be discharged a quantity equal to the difference in capacities of the expansible and collapsible vessel in its two conditions of operation. Assuming now that the parts are in the position shown in Fig. 1, clockwise rotation of the crank 29 produces a downward reciprocation of the rack-bar 23 and rod 19. The initial movement of these parts causes valve member 20 to seat upon the sleeve 17. Further movement produces a contraction or collapse of the vessel 4 owing to a downward movement of the head 6 because of the pressure of said rod and valve member on said head, and the material within the vessel 4 is forced through the discharge conduit leading therefrom. An opposite rotation of the crank 29 causes a reciprocation in the opposite direction of the rack-bar and rod 19, the initial movement of which raises the valve member 20 from the sleeve 17 until said member contacts the cage-nut 18. Thereafter further movement upward of the rack-bar and rod 19 raises the head of the vessel 4 by the pull exerted on said head. Even though the vessel be constructed of resilient metal, and therefore possess an inherent resiliency whereby it constitutes a spring, elevation of the head 6 will be retarded owing to the weight of the material thereabove and to the suction created within the vessel 4. As soon as valve member 20 is raised from its seat, material within the container 1 will flow into the interior of the vessel, filling the same eventually to its head 6. The dispensing device is now in condition for a second operation of the crank 29 to force the whole or any desired quantity through the discharge conduit.

A proportionate amount of the quantity dischargeable by the vessel may be obtained by moving the rack-bar less than its full stroke, until the pointer 30 is opposite a desired graduation on the scale 31. The vessel may be made to discharge a predetermined quantity without observing the scale and pointer by adjusting the stop member 33 until its lower edge indicates on the scale 35 the desired amount. Thereafter the rack-bar 27 will reciprocate to move rod 19 and head 6 of the vessel 4 downwardly only so far as is permitted by stop members 32 and 33, whereby a definite quantity will be delivered at each operation of the device.

While the head 6 of the vessel 4 has been shown as depressed at its central portion so as to contact the wall 5 when the vessel is in its fully collapsed condition, it will be apparent that the head 6 may be made in a single plane, in which case but a part of the material within the vessel will be discharged at each operation of the head. The preferred embodiment, however, employs the recessed head as illustrated on the drawing, in order that a vessel having a relatively large number of corrugations may be used, with the resultant advantage that there is a correspondingly less flexure of the material in each corrugation of the vessel at each operation of the head, without undue clearance between the end walls of said vessel when in fully collapsed condition. If desired, the operating crank 29 or the rack-bar 23 may be provided with any preferred counting means to indicate the number of actuations thereof, or to gage the quantity of material left in the container.

It will also be observed that the extension pipe 12 may be raised or lowered with respect to the riser pipe 11′, and rotated so that the spout 13 will be over the depression 36 or free of the container, to accommodate all kinds of receptacles for receiving the discharge from the dispensing device.

What is claimed is:—

1. A dispensing device comprising a container, an expansible and collapsible vessel provided with a movable head having a port communicating with said container, a valve controlling said port, means to expand and collapse said vessel, and a discharge conduit in communication with the space on the opposite sides of said movable head from the body of said container.

2. A dispensing device comprising a container, an expansible and collapsible vessel having a movable head provided with a port communicating with said container, a valve member controlling said port and adapted to move said head, means to operate said valve member, and a discharge conduit in communication with said vessel.

3. A dispensing device comprising a container, a resilient expansible and collapsible vessel having a movable head provided with a port communicating with said container, a valve member controlling said port, a member by which said valve member is actuated and said head moved, and a discharge conduit in communication with said vessel.

4. A dispensing device comprising a container, a rectilineally expansible and collapsible vessel having a movable head provided with a port communicating with said container, a valve member controlling said port, a reciprocating rod by which said valve member is actuated and said head moved, means for reciprocating said rod, and a discharge conduit in communication with said vessel.

5. A dispensing device comprising a container, a resilient expansible and collapsible vessel having a movable head provided with a port communicating with said container, a valve member controlling said port, a member by which said valve member is actuated and said head moved, gaging means operated by said head operating member, and a discharge member in communication with said vessel.

6. A dispensing device comprising a container, a resilient expansible and collapsible vessel having a movable head provided with a port communicating with said container, a valve member controlling said port, a member by which said valve member is actuated and said head moved, an adjustable stop movable longitudinally of said head-operating member for limiting the movement of the same, and a discharge conduit in communication with said vessel.

7. A dispensing device comprising a container, an expansible and collapsible vessel having a movable head provided with a port communicating with said container, a valve member controlling said port, a member for actuating said valve member and moving said head, initial movement of said last-named member in one direction closing said valve before moving said head, and initial movement thereof in the opposite direction opening said valve before moving said head, and a discharge conduit in communication with said vessel.

8. A dispensing device comprising a container, a rectilineally expansible and collapsible resilient vessel having a movable head provided with a port communicating with said container, a valve member controlling said port, a reciprocating member for actuating said valve member and moving said head, initial reciprocation of said last-named member in one direction closing said valve before moving said head, and initial reciprocation thereof in the opposite direction opening said valve before moving said head, means for reciprocating said last-mentioned member, and a discharge conduit in communication with said vessel.

9. A dispensing device comprising a container, a receptacle in communication with said container, an expansible and collapsible vessel, said vessel having a movable head provided with a port constituting a means of communication between said container and receptacle, a valve member controlling said port, a member for actuating said valve member and moving said head, initial movement of said last-named member in one direction closing said valve before moving said head, and initial movement thereof in the opposite direction opening said valve before moving said head, and a discharge conduit in communication with said receptacle.

10. A dispensing device comprising a container, an expansible and collapsible vessel having a movable head provided with a port communicating with said container, a valve member controlling said port, a member for actuating said valve member and moving said head, and a discharge conduit in communication with the space on the opposite side of said movable head from the body of said container.

11. A dispensing device comprising a container, a resilient expansible and collapsible vessel having a movable head provided with a port communicating with said container, a valve member controlling said port, a member by which said valve member is actuated and said head moved, a discharge conduit in communication with said vessel, a rotatable and vertically-adjustable delivery pipe forming an extension of said discharge conduit, and means for retaining said delivery pipe in adjusted position.

12. A dispensing device comprising a container, a receptacle in communication with said container, a discharge conduit leading from said receptacle, an expansible and collapsible vessel in said receptacle having a movable end wall, a valve-controlled port between said container and receptacle, and a member for actuating said valve and moving said movable end wall to force the material in operative relation thereto through said discharge conduit.

13. A dispensing device comprising a container, a receptacle in communication with said container, a discharge conduit leading from said receptacle, an expansible and collapsible vessel in said receptacle having a movable end wall, means for moving said movable end wall to force the material in operative relation thereto through said discharge conduit, and a valve operated by said last-named means for controlling the passage of the material in said container into operative relation with said movable end wall.

14. A dispensing device comprising a container, a receptacle in communication with said container, a discharge conduit leading from said receptacle, an expansible and collapsible vessel in said receptacle having a movable end wall, a valve in said end wall controlling admission of the material in said container to said receptacle, and a member for operating said valve and said movable end wall.

15. A dispensing device comprising a container, an expansible and collapsible vessel having a movable head provided with a port communicating with said container, a valve controlling said port and movable a limited distance with respect to said head, a single member for operating said valve and moving said head, and a discharge conduit communicating with said vessel.

16. A dispensing device comprising a container, an expansible and collapsible vessel provided with means of communication with said container, said vessel being provided with a movable end wall having its central portion depressed to engage the opposite end wall when said vessel is collapsed, a valve controlling the communication between said container and vessel, means to expand and contract said vessel, and a discharge conduit in communication with said vessel.

In testimony whereof I have signed this specification.

WESTON M. FULTON.